United States Patent [19]  [11] 3,907,832
Hamill  [45] Sept. 23, 1975

[54] ANTIBIOTIC A204I DERIVATIVES
[75] Inventor: Robert L. Hamill, New Ross, Ind.
[73] Assignee: Eli Lilly and Company, Indianapolis, Ind.
[22] Filed: Nov. 15, 1974
[21] Appl. No.: 524,178

[52] U.S. Cl. .............................. 260/345.7; 424/283
[51] Int. Cl.² ....................................... C07D 309/22
[58] Field of Search ..................... 260/345.7, 345.1

[56] References Cited
UNITED STATES PATENTS
3,705,238   12/1972   Hamill et al. ...................... 424/283

OTHER PUBLICATIONS
Jones et al., J. Amer. Chem. Soc., 95, 3399, (1973).

Primary Examiner—Bernard Helfin
Assistant Examiner—Nicky Chan
Attorney, Agent, or Firm—Nancy J. Harrison; Everet F. Smith

[57] ABSTRACT

Antibiotic A204I monoether and monothioether derivatives are anticoccidial, as well as antimicrobial agents. Some A204I monoether derivatives are also insecticidal and acaricidal agents and increase feed-utilization efficiency in ruminants.

4 Claims, No Drawings

ANTIBIOTIC A204I DERIVATIVES

BACKGROUND OF THE INVENTION

1. Field of the Invention

Coccidiosis is a well-known protozoan disease resulting from infection by one or more species of Eimeria or Isospora (for a summary, see Lund and Farr in "Diseases of Poultry," FIfth Ed. Biester and Schwarte, Eds., Iowa State University Press, Ames, Ia., 1965, pp. 1056–1096). When left untreated, the severe infections of coccidiosis lead to poor weight gain, reduced feed efficiency, high morbidity and mortality in fowl. The morbidity and mortality caused by coccidiosis infections create extensive economic loss when such infections are left untreated or unchecked. The control of this disease is, therefore, of paramount importance to the poultry industry. In the continuing efforts to find improved agents for the control of this disease, decreased toxicity is one of the desirable improvements.

2. Description of Prior Art

Antibiotic A204 factor I, from which the novel compounds of the present invention are prepared, is described in U.S. Pat. No. 3,705,238. The structure of antibiotic A204I has been determined by X-ray diffraction studies [Noel D. Jones, Michael O. Chaney, James W. Chamberlin, Robert L. Hamill and Sue Chen, *J. Amer. Chem. Soc.* 95, 3399–3400 (1973)]. This structure is shown in Formula I:

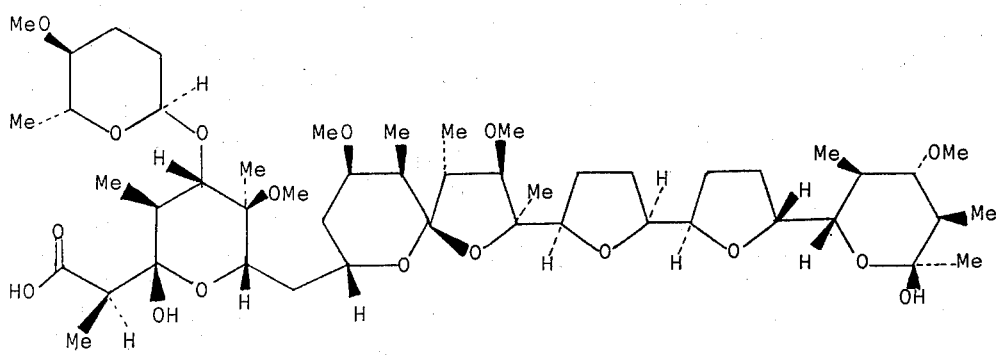

I

SUMMARY OF THE INVENTION

This invention relates to novel monoether and monothioether derivatives of antibiotic A204I. In particular, it relates to antibiotic A204I ether and thioether derivatives of the following formula:

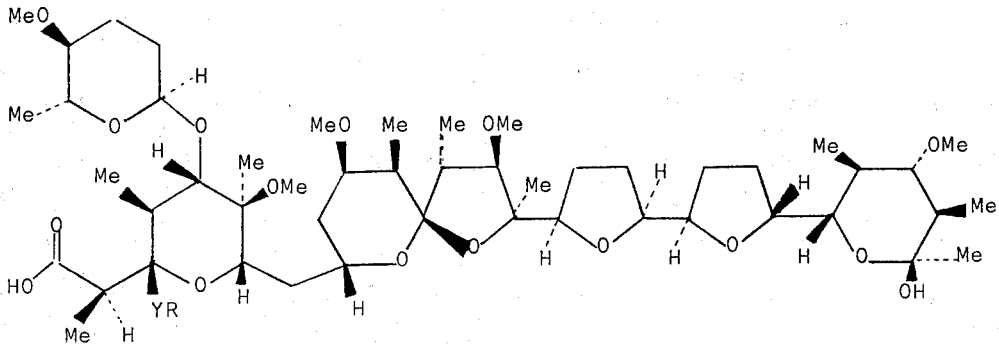

II wherein:

Y represents O or S; and
R represents $C_1$–$C_6$-alkyl,
  $C_1$–$C_4$-alkoxy-$C_2$–$C_5$-alkyl,
  $C_1$–$C_4$-alkoxycarbonyl-$C_2$–$C_5$-alkyl,
  amino-$C_2$–$C_5$-alkyl,
  mercapto-$C_2$–$C_5$-alkyl,
  hydroxyalkyl,
  haloalkyl, or
  $(R')_m$-phenyl$(CH_2)_n$—,
wherein R' represents $C_1$–$C_4$-alkyl, $C_1$–$C_4$-alkoxy, or hydroxy;
$m$ represents 0–2; and
$n$ represents 0–3;

and to the physiologically-acceptable cationic salts thereof. For the sake of brevity, the expression "A204I derivative" as used herein refers to an A204I derivative as herein defined.

The novel A204I derivatives of the present invention are antimicrobial agents. In a preferred application of the compounds of this invention, the A204I derivatives are effective anticoccidial agents. The A204I derivatives of the present invention are less toxic than antibiotic A204I. This invention also relates to novel compositions which contain an A204I derivative and which, when added to animal feedstuffs, are effective anticoccidial agents. Many of the A204I derivatives also exhibit acaricidal and insecticidal activity and, additionally, increase feed-utilization efficiency in ruminants.

DETAILED DESCRIPTION OF THE INVENTION

The novel A204I derivatives of the present invention are as defined hereinabove in Formula II. "Alkyl" and "alkoxy" as used herein represent either straight- or branched-chain alkyl and alkoxy radicals.

The term "hydroxyalkyl" refers either to a monohydroxy-$C_2$–$C_5$-alkyl moiety or, when Y is 0, to the 2,3-dihydroxyprop-1-yl moiety.

The term "haloalkyl" refers to a $C_2$–$C_5$-alkyl moiety having from one to three halogen substituents, selected from the group consisting of bromine, chlorine, and fluorine. When the alkyl moiety is dihalo- or trihalo-substituted, the halo-substituents must be the same halogen moiety.

"Physiologically-acceptable" cationic salts are those salts formed from cations which do not increase the toxicity of the compound as a whole toward warm-blooded animals. Otherwise, the identity of the salt-forming cation is not critical, although in some instances one may be chosen which exhibits special advantages, such as solubility, ease of crystallization and the like. Representative and suitable cations include the alkali metals such as sodium, potassium and lithium; alkaline-earth metals such as calcium, magnesium and strontium; heavy metals such as copper and zinc; ammonium; and the like.

Preferred A204I derivatives are those compounds of Formula II wherein Y represents 0 and R represents $C_1$–$C_6$-alkyl. These preferred derivatives are prepared by reaction of A204I with alcohols which are, in general, more readily available and less expensive than the starting alcohols or thiols used in the preparation of other Formula II compounds.

The novel A204I derivatives of the present invention are prepared by reacting antibiotic A204I or a salt thereof with a corresponding primary alcohol or thiol. Antibiotic A204I and the salts thereof are described in U.S. Pat. No. 3,705,238.

With some of the starting alcohols or thiols it may be necessary to add an acid catalyst to the reaction. Suitable catalysts include hydrochloric acid, sulfuric acid, perchloric acid, methanesulfonic acid, benzenesulfonic acid, toluenesulfonic acid, selenium dioxide, and boron trifluoride.

A solvent such as, for example, water, acetone, benzene, ether, tetrahydrofuran, or dioxane may be added to facilitate the reaction. Reactions generally occur at room temperature, although higher temperatures may be used.

Although ordinary reaction work-up procedures are sometimes sufficient, additional purification may be required to obtain the compounds of this invention. Such purification may be accomplished by well-known methods, such as, for example, column chromatography, thin-layer chromatography, fractional crystallization and the like. Illustrative suitable adsorbents for chromatographic separations include silica gel, alumina, Florisil (magnesium silicate, Floridin Co., P. O. Box 989, Tallahassee, Fla.), carbon, and ion exchange resins.

The A204I derivatives are useful anticoccidial agents. More particularly, when administered to poultry, the A204I derivatives are effective agents in the prophylactic treatment for and in the control of coccidiosis. The A204I derivative is conveniently administered to poultry as a feed component.

In a preferred embodiment, novel compositions are provided which comprise an A204I derivative intimately dispersed in or admixed with an edible, inert, solid carrier or diluent to provide a premix or medicated feed supplement. An inert carrier or diluent is one that is nonreactive with respect to the A204I derivative. The carrier or diluent is preferably one that is or may be an ingredient of animal feed.

The preferred compositions of this invention are feed premixes in which an A204I derivative is present in relatively large amounts. These compositions are suitable for addition to poultry feed either directly or after an intermediate dilution or blending step. Examples of carriers or diluents suitable for such compositions are animal-feed ingredients such as distillers dried grains, soybean mill run, alfalfa granules, wheat middlings, corn gluten meal, exfoliated hydrobiotites, corn meal, citrus meal, fermentation residues, ground oyster shells, attapulgus clay, wheat shorts, molasses solubles, corncob meal, edible vegetable substances, toasted dehulled soya flour, soybean feed, soybean meal feed, antibiotic mycelia, soya grits, kaolin, talc, crushed limestone, and the like. The preferred diluents are soybean products such as soybean mill run and soybean feed, alfalfa products such as alfalfa granules, and corn products such as corn gluten meal and corn grits.

The compositions are prepared by intimately dispersing or admixing an A204I derivative throughout the solid inert carrier by methods such as grinding, stirring, milling, or tumbling. In some instances, the A204I derivative may be adsorbed on the carrier by spraying a solution thereof into a rotating mill containing the diluent. By selecting proper diluents and by altering the ratio of carrier to active ingredient, compositions of any desired concentration can be prepared.

The feed premixes are formulated so that the total active ingredient is present within the range of from 5 to 80 percent by weight, and the diluent or carrier is present correspondingly within the range of from 95 to 20 percent by weight of the premix. A preferred ratio is about 40 percent by weight of A204I derivative to about 60 percent by weight of diluent. The premixes may be further diluted with an animal-feed supplement or may be added directly to an animal feedstuff in order to provide a suitable medicated feedstuff which can be eaten directly by poultry.

The premix diluted with feed supplement may be further diluted with materials such as corn meal or soybean meal before being incorporated in the animal feed. This dilution can serve to facilitate uniform distribution of the anticoccidial agents in the finished feed. The finished feed is one that contains a source of fat, protein, carbohydrate, minerals, vitamins and other nutritional factors.

When used in the prophylactic treatment for coccidiosis, relatively low levels of an A204I derivative in poultry feed are sufficient to afford poultry good protection against coccidiosis. For example, a nontoxic amount of an A204I derivative is administered to chickens, preferably orally on a daily basis, in an amount of from about 0.001 to about 0.05 percent of the daily feed intake by weight and preferably in the range of from 0.0025 to 0.01 percent. The most advantageous dosage level will, of course, vary with particular circumstances, such as the type and severity of the coccidial infection to be treated, the daily feed intake of the birds, and the like.

Prior to administration of the medicated feed to poultry, the premix is uniformly dispersed in the animal feed by suitable mixing or blending procedures.

In treating poultry according to the method of this invention, one-day-old broiler cockerels are started on the medicated feed containing an A204I derivative. This procedure applies for broilers, roasters, fryers, and for replacement stock for layer or broiler-breeder flocks. Broiler birds are maintained on the medicated feed of this invention throughout their life. Replacement stock for layer flocks are maintained on this medicated feed for a minimum of 14 to 22 weeks.

Alternatively, an A204I derivative or a salt thereof is added directly to a conventional basal ration which can comprise the following ingredients: meat and bone scrap; fishmeal; vitamin $B_{12}$; poultry-byproduct meal; dehulled-soybean-oil meal; dehydrated alfalfa meal; corn gluten meal; pulverized oats; ground barley; corn meal; wheat middlings; dried grain and whey fermentation solubles; methionine hydroxy analog calcium; riboflavin; calcium pantothenate; choline chloride; niacin; animal fat; menadione sodium bisulfite; vitamin E supplement; butylated hydroxytoluene; vitamin A palmitate; deactivated animal sterol; calcium carbonate; defluorinated phosphate; sodium chloride; calcium iodate; manganese oxide; zinc oxide; cobalt hydroxide; and cobalt carbonate.

Such medicated feed composition is prepared by adding the A204I derivative to the basal ration in an amount constituting from about 0.001 to about 0.05 percent by weight of the final mixture. The ingredients are thoroughly admixed to provide the ration which is fed to young chicks.

The anticoccidial effects of the A204I derivatives are illustrated by the effects of various of the compounds in controlling single-species infections of *Eimeria tenella*, *Eimeria necatrix*, *Eimeria mivati*, and *Eimeria brunetti* and a multiple-species infection of *Eimeria maxima* and *Eimeria tenella* in chickens.

METHOD

For these studies, groups of five 7-day-old chicks were fed a mash diet containing therein a uniformly dispersed A204I derivative. After having been on this ration for 48 hours, each bird was inoculated with sporulated oocysts of the particular species of Eimeria being tested.

Other groups of five 7-day-old chickens were fed a mash diet which did not contain an A204I derivative. Some of these groups were also inoculated with Eimeria after 48 hours and served as infected controls. Other of these groups were not inoculated with Eimeria and served as normal controls. The results of treatment were evaluated seven days after inoculation. The birds were weighed, sacrificed and examined for evidence of coccidial lesions. Coccidial involvement was expressed on an arbitrary scale, increasing from zero (no evidence of coccidiosis) to four (maximum involvement for the Eimeria sp. tested). The percent reduction in lesion score is calculated by subtracting the average lesion score of the treated group from the average lesion score of the infected control group, dividing this difference by the average lesion score of the infected control group, and multiplying the quotient by 100.

The percent weight gain is calculated using the weight gain of normal controls as 100 percent.

The results of these tests are shown in the following tables:

TABLE I

Efficacy of A204I Derivatives Against *E. tenella* in Broiler Cockerels

| A204I Ether[1] | % in Diet | % Mortality[2] | % Weight Gain | Average Cecal Lesion Score | % Reduction Lesion Score |
|---|---|---|---|---|---|
| Methyl | .005 | 0 | 98 | .1 | 98 |
|  | .00165 | 15 | 95 | 3.7 |  |
| Ethyl | .005 | 5 | 95 | .2 | 95 |
|  | .00165 | 0 | 88 | 2.4 | 40 |
| n-Propyl | .0066 | 20 | 79 | 3.7 | 0 |
|  | .00165 | 35 | 79 | 4.0 | 0 |
| Infected Controls | — | 45 | 83 | 4.0 | — |
| Normal Controls | — | — | 100 | — | — |
| n-Propyl | .005 | 0 | 96 | 0 | 100 |
|  | .0025 | 0 | 87 | 1.8 | 50 |
| Isopropyl | .0025 | 0 | 95 | 2.3 | <40 |
| Methyl cellosolve | .0025 | 0 | 90 | 2.9 | <40 |
| Infected control | — | 5 | 55 | 3.6 | — |

[1] Three replicates of five birds each per medicated group; four replicates of five birds each per infected-control group.
[2] Due to coccidiosis.

TABLE II

Efficacy of A204I Derivatives Against *E. necatrix* in Broiler Cockerels

| A204I Ether[1] | % in Diet | % Mortality[2] | % Weight Gain | Average Intestinal Lesion Score | % Reduction Lesion Score |
|---|---|---|---|---|---|
| n-Propyl | .01 | 0 | 89 | 0 | 100 |
|  | .005 | 6.7 | 92 | 0.2 | 95 |
|  | .0025 | 0 | 63 | 1.6 | 59 |
| Methyl | .02 | 6.7 | 95 | 0.67 | 83 |
|  | .01 | 26.7 | 49 | 2.5 | 35 |
| Infected Controls | — | 85 | 18 | 3.9 | — |
| Normal Controls | — | — | 100 | — | — |

[1] Three replicates of five birds each per medicated group; four replicates of five birds each per infected-control group
[2] Due to coccidiosis.

TABLE III

Efficacy of A204I Derivatives Against *E. mivati* in Broiler Cockerels

| A204I Ether[1] | % in Diet | % Mortality[2] | % Weight Gain | Average Intestinal Lesion Score | % Reduction Lesion Score |
|---|---|---|---|---|---|
| Ethyl | .02 | 0 | 79 | 0 | 100 |
|  | .01 | 0 | 99 | 0 | 100 |
|  | .005 | 0 | 103 | 0 | 100 |
| Methyl | .02 | 0 | 103 | 0 | 100 |
|  | .01 | 0 | 94 | 0.27 | 85 |
|  | .005 | 0 | 70 | 1.0 | 43 |
| n-Propyl | .01 | 0 | 98 | 0 | 100 |
|  | .005 | 0 | 97 | 0 | 100 |
|  | .0025 | 0 | 94 | 0.27 | 85 |
| Infected Controls | — | 0 | 44 | 1.75 | — |
| Normal Controls | — | 0 | 100 | — | — |

[1] Four replicates of five birds each
[2] Due to coccidiosis.

TABLE IV

Efficacy of A204I Derivatives Against
E. Brunetti in Broiler Cockerels

| A204I Ether[1] | % in Diet | % Mortality[2] | % Weight Gain | Average Lesion Score | % Reduction Lesion Score |
|---|---|---|---|---|---|
| Methyl | .02 | 0 | 83 | 0 | 100 |
|  | .01 | 0 | 74 | 0 | 100 |
|  | .005 | 0 | 70 | 0.87 | — |
| n-Propyl | .01 | 0 | 89 | 0 | 100 |
|  | .005 | 0 | 89 | 0 | 100 |
|  | .0025 | 0 | 95 | 0.80 | — |
| Infected Controls | — | 0 | 51 | 0.85 | — |
| Normal Controls | — | 0 | 100 | — | — |

[1]Four replicates of five birds each
[2]Due to coccidiosis.

TABLE V

Efficacy of A204I Derivatives Against a Mixed Infection
of E. maxima and E. tenella in Broiler Cockerels

| A204I Ether[1] | % in Diet | % Mortality[2] | % Weight Gain | Intestinal Lesions Average Lesion Score | Intestinal Lesions % Reduction Lesion Score | Cecal Lesions Average Lesion Score | Cecal Lesions % Reduction Lesion Score |
|---|---|---|---|---|---|---|---|
| Methyl | .02 | 0 | 98 | 0 | 100 | 0.2 | 94 |
|  | .01 | 6.7 | 82 | 0.07 | 91 | 2.87 | — |
|  | .005 | 0 | 68 | 0.07 | 91 | 3.47 | — |
| n-Propyl | .01 | 0 | 98 | 0 | 100 | 0 | 100 |
|  | .005 | 0 | 99 | 0.07 | 91 | 0.07 | 98 |
|  | .0025 | 0 | 94 | 0.13 | 84 | 2.67 | — |
| Infected Controls | — | 5 | 51 | 0.79 | — | 3.3 | — |
| Normal Controls | — | — | 100 | — | — | — | — |

[1]Three replicates of five birds each per medicated group; four replicates of five birds each per infected-control group.
[2]Due to coccidiosis.

In another aspect, the A204I derivatives of the present invention improve feed utilization in ruminants which have a developed rumen function. Young ruminants, basically those still unweaned, function as monogastric animals. As young ruminants being to eat solid food, the rumen function begins to develop; and the microbiological population of the rumen being to increase. After the animal has eaten solid feed for a time, its rumen function reaches full development and continues to operate throughout the animal's life. Some economically important ruminant animals are cattle, sheep and goats.

The A204I derivatives of the present invention are typically effective in increasing efficiency of feed utilization when administered to ruminants orally at rates of from about 0.25 to about 12.5 mg/kg/day. Most beneficial results are achieved at rates of from about 0.5 to about 7.4 mg/kg/day. A preferred method of administering the compounds of the present invention is by mixing them with the animals' feed; however, they can be administered in other ways, for example, tablets, drenches, boluses, or capsules. Formulation of these various dosage forms can be accomplished by methods well known in the veterinary pharmaceutical art. Each individual dosage unit should contain a compound of this invention in a quantity directly related to the proper daily dose for the animal to be treated.

The ability of the compounds of this invention to increase feed-utilization efficiency in ruminants is illustrated by the following in vitro test:

METHOD

Rumen fluid is obtained from a steer with a surgically-installed fistula opening into the rumen. The steer is maintained on a high-grain ration, the composition of which follows:

| | |
|---|---|
| 69.95% | coarse ground corn |
| 10.00% | ground corncobs |
| 8.00% | soybean meal (50% protein) |
| 5.00% | alfalfa meal |
| 5.00% | molasses |
| 0.60% | urea |
| 0.50% | dicalcium phosphate |
| 0.50% | calcium carbonate |
| 0.30% | salt |
| 0.07% | vitamins A and $D_2$ premix* |
| 0.05% | vitamin E premix** |
| 0.03% | trace mineral premix*** |

*Containing per pound: 2,000,000 I.U. of vitamin A; 227,200 I.U. of vitamin $D_2$ and 385.7 g of soybean feed with 1% oil added
**Corn distillers dried grains with solubles containing 20,000 I.U. of d-alpha-tocopheryl acetate per pound
***Containing manganous oxide, potassium iodide, cobalt carbonate, copper oxide and zinc sulfate A sample of rumen fluid is strained through four layers of cheesecloth, and the filtrate is collected. The particulate matter retained by the cheesecloth is resuspended in enough physiological buffer to return it to the original volume of the rumen fluid, and this suspension is strained again. The buffer used has the following composition:

| g/liter | Ingredient |
|---|---|
| 0.316 | $Na_2HPO_4$ |
| 0.152 | $KH_2PO_4$ |
| 2.260 | $NaHCO_3$ |
| 0.375 | KCl |
| 0.375 | NaCl |
| 0.112 | $MgSO_4$ |
| 0.050 | $CaCl_2 \cdot 2H_2O$ |
| 0.008 | $FeSO_4 \cdot 7H_2O$ |
| 0.004 | $MnSO_4 \cdot H_2O$ |
| 0.004 | $ZnSO_4 \cdot 7H_2O$ |
| 0.002 | $CuSO_4 \cdot 5H_2O$ |
| 0.001 | $CoCl_2 \cdot 6H_2O$ | as described by Cheng et al. in *J. Dairy Sci.* 38, 1225–1230 (1955).

The two filtrates are combined and allowed to stand until particulate matter separates to the top. The clear layer is separated, diluted with the same buffer (1:1) and then adjusted to between pH 6.8–7.0.

The diluted rumen fluid (10 ml) is placed in a 25-ml flask with 40 mg of the above-described feed, an additional 5 mg of soybean protein, and the compound to be tested. Four replicate flasks are used per treatment. Two sets of four control flasks each are also employed. A zero-time control and an incubated 16-hour control are used. All test flasks are incubated for 16 hours at 38°C. After incubation the pH is measured, and 25 percent metaphosphoric acid (2 ml) is added to each flask. The samples are allowed to settle, and the supernatant is analyzed by gas chromatography for propionate, acetate, and butyrate compounds. Active compounds significantly increase propionate production over that of controls.

Test-compound results are statistically compared with control results. Table VI below shows the ratio of volatile-fatty-acid (VFA) concentrations in treated flasks to corresponding concentrations in control flasks.

TABLE VI

Feed-Utilization Efficiency Activity of A204I Derivatives

| A204I Derivatives | mcg/ml diluted rumen fluid | Acetate | Propionate | Butyrate | Total VFA |
|---|---|---|---|---|---|
| Methyl Ether | 25.00 | .94 | 1.91 | .55 | .81 |
|  | 1.00 | 1.00 | 1.14 | .77 | 1.15 |
|  | .25 | .92 | 1.09 | 1.03 | .93 |
| Ethyl Ether | 25.00 | .97 | 1.73 | .63 | .85 |
|  | 1.00 | .88 | 1.02 | 1.29 | .77 |
|  | .25 | .87 | 1.08 | 1.24 | .73 |

Certain of A204I derivatives are also insecticides and acaricides. For example, the A204I methyl ether and ethyl ether derivatives are active against insects, such as Southern armyworm and housefly, and against mites, such as two-spotted spider mite, when applied at rates as low as 1000 ppm and are also active against mosquito larvae when applied at rates as low as 20 ppm.

The A204I derivatives of the present invention also inhibit the growth of other pathogenic organisms. For example, both the A204I ethyl ether and methyl ether derivatives inhibit the growth of *Bacillus subtilis* and *Mycobacterium avium* at levels as low as 1.25 micrograms per milliliter and anaerobic bacteria at levels as low as 0.5 microgram per milliliter.

The A204I derivatives of the present invention are less toxic than antibiotic A204I. The acute toxicity in mice of antibiotic A204I, administered orally and expressed as $LD_{50}$, is 10 mg/kg. The acute toxicities in mice of various of the A204I derivatives, also administered orally and expressed as $LD_{50}$, are as follows:

| Compound | $LD_{50}$(mg/kg) |
|---|---|
| A204I methyl ether | 43 ± 8 and 70 ± 10 |
| A204I ethyl ether | 115 ± 30 |
| A204I n-propyl ether | 38 ± 6 |
| A204I isopropyl ether | 20–36 |

A comparison of the effects of A204I n-propyl ether with those of antibiotic A204I in feeding studies in rats gives further evidence of the advantage of the A204I derivatives. For this test, five rats of each sex were studied for 14 days at each treatment level. The mean changes in body weight and the mean amounts of food ingested were calculated for each group. A comparison of the results of these tests is given in Table VII:

TABLE VII

Rat Feeding Studies

| Compound | Level (ppm) | Male Body Weight Change (g) | Male Food (g) | Female Body Weight Change (g) | Female Food (g) |
|---|---|---|---|---|---|
| Control | — | +58.2 | 238 | +43.2 | 236 |
| A204I | 5 | +31.4 | 224 | +20.2 | 189 |
|  | 10 | −29.8 | 147 | −25.4 | 137 |
| A204I-n-propyl ether | 5 | +77.8 | 281 | +34.0 | 224 |
|  | 10 | +45.2 | 221 | +36.0 | 218 |
|  | 20 | +66.6 | 288 | +31.6 | 229 |

The following examples are provided to more fully illustrate the preparation of the compounds of the present invention.

EXAMPLE 1

Preparation of A204I Methyl Ether Derivative from A204I Sodium Salt

Antibiotic A204I sodium salt (20 g) was dissolved in methanol (1.1), and water (500 ml) was added slowly. This solution was adjusted to pH 3.0 by the addition of 6 N hydrochloric acid. The resulting solution was stirred for 1 hour and then was extracted with an equal volume of chloroform. This chloroform extract was evaporated to dryness under vacuum.

The resulting residue (2 g) was dissolved in 10 ml of a benzene-ethyl acetate (7:3) mixture, and this solution was chromatographed on a 2- × 51-cm silica gel column (Woelm), eluting with the same benzene-ethyl acetate solvent mixture. Elution was monitored by thin-layer chromatography. The fractions containing A204I methyl ether derivative were combined and evaporated to dryness under vacuum. A204I methyl ether derivative (1.4 g) crystallized from methanol-water, mp 115°–117°C, $[\alpha]_D^{25}$ +75.00 (c=1, $CH_3OH$); $pK_a'$ (66% aqueous dimethylformamide) 7.1.

Analysis. Calculated for $C_{50}H_{86}O_{17}$ (percent): C, 62.61; H, 9.04; O, 28.35. Found (percent): C, 63.88; H, 8.97; O, 27.66.

$R_f$ values of A204I methyl ether derivative are reported in Example 6.

EXAMPLE 2

Preparation of A204I Methyl Ether Derivative from A204I

Antibiotic A204I in the acid form (400 mg) was dissolved in methanol (10 ml), and water (5 ml) was added. After being allowed to stand one hour, the solution was evaporated under vacuum. The resulting residue was chromatographed as described in Example 1, to give A204I methyl ether derivative.

EXAMPLE 3

Preparation of A204I n-Propyl Ether Derivative

Antibiotic A204I in the acid form (10 g) was dissolved in n-propanol (200 ml). This solution was allowed to stand at room temperature for one week and then was evaporated to dryness in vacuo. The residue thus obtained was a mixture of starting A204I and the desired product.

This mixture was dissolved in 20 ml of benzene-ethyl acetate (7:3), and this solution was applied to a 4- ×

120-cm silica gel (Grade 62) column, eluting with benzene-ethyl acetate (7:3). Elution was monitored by thin-layer chromatography on silica gel in benzene-ethyl acetate (3:2), using $H_2SO_4$ spray for detection. The desired A204I n-propyl ether derivative was eluted from the column before the remaining starting material was eluted. The fractions containing A-204I n-propyl ether deivative were combined and evaporated to dryness. The residue crystallized from acetone-water to give 4.15 g. of A-204I n-propyl ether derivative, mp 114°–116°C, $[\alpha]_D^{25} + 73.08$ (c=1, $CH_3OH$); $pK_a'$ (66% aqueous dimethylformamide) 7.8.

Analysis. Calculated for $C_{52}H_{90}O_{17}$ (percent):
C, 63.26; H, 9.19; O, 27.55. Found (percent):
C, 63.60; H, 9.74; O, 26.87.

$R_f$ values of A204I n-propyl ether derivative are reported in Example 6.

EXAMPLE 4

Preparation of A204I Methyl Thioether Derivative

Antibiotic A204I in the acid form (400 mg) was added to a solution containing acetone (10 ml), methanethiol (100 ml) and p-toluenesulfonic acid (10 mg). The resulting solution was allowed to stand at room temperature for 16 hours and then was evaporated to dryness in vacuo. The residue thus obtained was dissolved in a minimal amount of benzene:ethyl acetate (4:1); this solution was applied to a 2- × 40-cm silica gel (Grace 62) column. Elution with benzene:ethyl acetate (4:1) provided fractions containing A204I methyl thioether derivative; these fractions were combined and evaporated in vacuo. The residue thus obtained crystallized from acetonitrile-water to give 119 mg of A204I methyl thioether derivative.

EXAMPLE 5

Preparation of A204I n-Butyl Ether Derivative

Antibiotic A204I in the acid form (500 mg) was dissolved in n-butanol (25 ml); 0.01 N hydrochloric acid (2.5 ml) was added. The resulting solution was allowed to stand at room temperature for 72 hours and then was evaporated to dryness in vacuo. The residue thus obtained was dissolved in a minimal amount of benzene:ethyl acetate (4:1); this solution was applied to a 2- by 50-cm silica gel (Grace 62) column. Elution with benzene:ethyl acetate (4:1) provided fractions containing A204I n-butyl ether derivative. These fractions were combined and evaporated under vacuum to dryness; the residue thus obtained crystallized from acetonitrile-water to give 156 mg of A204I n-butyl ether derivative.

EXAMPLE 6

Preparation of A204I Ethyl Ether Derivative

A204I ethyl ether derivative was prepared from antibiotic A204I and ethanol by the method used in Example 3, crystallized from acetonitrile, mp 117°–120°C., $[\alpha]_D^{25} + 74.23$ (c=1, $CH_3OH$); $pK_a'$ (66% aqueous dimethylformamide) 8.0.

Analysis. Calculated for $C_{51}H_{88}O_{17}$ (percent):
C, 62.94; H, 9.11; O, 27.95. Found (percent):
C, 63.34; H, 9.12; O, 27.21.

The $R_f$ values of A204I ethyl ether, methyl ether, and n-propyl ether derivatives in various paper and thin-layer chromatographic systems, using *Bacillus subtilis* ATCC 6633 (pH 6.0) as the bioautograph test organism, are as follows (antibiotic A204I values given as a reference standard):

| Solvent System Paper: | A204I | $R_f$ Values Ethyl Ether | Methyl Ether | n-Propyl Ether |
|---|---|---|---|---|
| water:methanol:acetone (12:3:1)-solution is adjusted to pH 10.5 with $NH_4OH$ and then lowered to pH 7.5 with $H_3PO_4$ | 0.41 | 0.35 | 0.33 | 0.21 |
| water:methanol:acetone(12:3:1)-solution is adjusted to pH 10.5 with $NH_4OH$ and then lowered to pH 7.5 with dil. HCl | 0.50 | 0.74 | 0.70 | 0.77 |
| 1% methyl isobutyl ketone, 0.5% $NH_4OH$ in water | 0.34 | 0.44 | 0.56 | 0.21 |
| benzene saturated with water | 0.49 | 0.57 | 0.68 | 0.53 |
| water:ethanol:acetic acid (70:24:6) | 0.61 | 0.52 | 0.67 | 0.59 |
| water with 1% piperidine and 2% p-toluenesulfonic acid | 0.71 | 0.57 | 0.74 | 0.62 |
| Thin-Layer-Silica Gel | | | | |
| ethyl acetate | 0.66 | 0.66 | 0.48 | 0.69 |
| ethyl acetate:benzene(1:1) | 0.23 | 0.41 | 0.30 | 0.51 |
| ethyl acetate:chloroform (2:1) | 0.43 | 0.49 | 0.38 | 0.60 |
| Thin Layer-Cellulose: | | | | |
| Water:methanol:acetone (12:3:1)-solution is adjusted to pH 10.5 with $NH_4OH$ and then lowered to pH 7.5 with dil. HCl | 0.27 | 0.53 | 0.67 | 0.22 |

EXAMPLES 7–21

A204I n-pentyl ether derivative, prepared by reaction of antibiotic A204I and n-pentanol, using the method of Example 4.

A204I methoxycarbonylmethyl ether derivative, prepared by reaction of antibiotic A204I and methyl glycolate, using the method of Example 4.

A204I hydroxyethyl ether derivative, prepared by reacting antibiotic A204I and ethylene glycol, using the method of Example 3, crystallized from acetonitrile-water, mp 120°–122°C.

A204I 2-mercaptoethyl ether derivative, prepared by reaction of antibiotic A204I and 2-mercaptoethanol, using the method of Example 3.

A204I 2-aminoethyl ether derivative, prepared by reaction of antibiotic A204I and 2-aminoethanol, using the method of Example 4.

A204I isopropyl ether derivative, prepared by reaction of antibiotic A204I and isopropanol, using the method of Example 3, mp 158°–160°C.

A204I 2-methoxyethyl ether derivative, prepared by reaction of antibiotic A204I and 2-methoxyethanol, using the method of Example 3, mp 128°–130°C.

A204I ethyl thioether derivative, prepared by reaction of antibiotic A204I and ethanethiol, using the method of Example 4.

A204I 2,2,2-trichloroethyl ether derivative, prepared by reaction of antibiotic A204I and 2,2,2-trichloroethanol, using the method of Example 2.

A204I 2,2,2-trifluoroethyl ether derivative, prepared by reaction of antibiotic A204I and 2,2,2-trifluoroethanol, using the method of Example 2.

A204I 2,3-dihydroxyprop-1-yl ether derivative, prepared by reaction of antibiotic A204I and glycerol, using the method of Example 4.

A204I benzyl ether derivative, prepared by reaction of antibiotic A204I and benzyl alcohol, using the method of Example 4.

A204I phenyl ether derivative, prepared by reaction of antibiotic A204I and phenol, using the method of Example 4.

A204I tolyl thioether derivative, prepared by reaction of antibiotic A204I and thiocresol, using the method of Example 4.

A204I 3-phenylprop-1-yl ether derivative, prepared by reaction of antibiotic A204I and 3-phenyl-1-propanol, using the method of Example 4.

A204I 2-tert-butyl-6-methylphenyl ether derivative, prepared by reaction of antibiotic A204I and 2-tert-butyl-6-methylphenol, using the method of Example 4.

A204I 4-tert-butylphenyl thioether derivative, prepared by reaction of antibiotic A204I and 4-tert-butylbenzenethiol, using the method of Example 4.

A204I 3-(m-methoxyphenyl)prop-1-yl ether derivative, prepared by reaction of antibiotic A204I and 3-(m-methoxyphenyl)propanol, using the method of Example 4.

A204I 4-n-butoxyphenyl ether derivative, prepared by reaction of antibiotic A204I and 4-n-butoxyphenol, using the method of Example 4.

A204I 4-hydroxybenzyl ether derivative, prepared by reaction of antibiotic A204I and 4-hydroxybenzyl alcohol, using the method of Example 4.

A204I 5-chloropent-1-yl ether derivative, prepared by reaction of antibiotic A204I and 5-chloro-1-pentanol, using the method of Example 4.

I claim:

1. The A204I derivative of the formula:

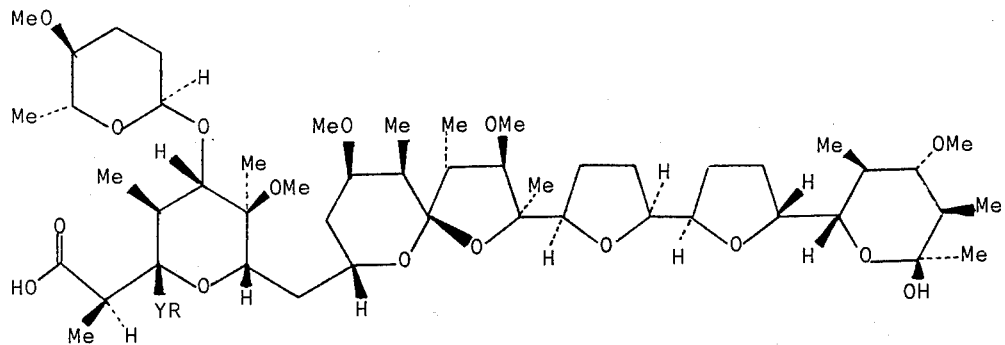

wherein:
Y represents O; and
R represents $C_1$–$C_6$-alkyl,
and the physiologically-acceptable cationic salts thereof.

2. The A204I derivative of claim 1 wherein R is methyl.

3. The A204I derivative of claim 1 wherein R is ethyl.

4. The A204I derivative of claim 1 wherein R is n-propyl.

* * * * *